United States Patent
Park et al.

(10) Patent No.: US 7,403,252 B2
(45) Date of Patent: Jul. 22, 2008

(54) IN-PLANE SWITCHING MODE LIQUID CRYSTAL DISPLAY DEVICE

(75) Inventors: Ki-Bok Park, Gyeonggi-Do (KR); Sang-Ho Choi, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 293 days.

(21) Appl. No.: 10/964,923

(22) Filed: Oct. 15, 2004

(65) Prior Publication Data
US 2005/0117102 A1 Jun. 2, 2005

(30) Foreign Application Priority Data
Nov. 29, 2003 (KR) .................. 10-2003-0086028

(51) Int. Cl.
*G02F 1/1343* (2006.01)
(52) U.S. Cl. ..................................... 349/141
(58) Field of Classification Search ............... 349/141, 349/38
See application file for complete search history.

(56) References Cited

U.S. PATENT DOCUMENTS

| | | | |
|---|---|---|---|
| 5,434,687 A * | 7/1995 | Kawata et al. ............. 349/96 |
| 5,610,743 A * | 3/1997 | Tsai ........................ 349/124 |
| 5,977,562 A * | 11/1999 | Hirakata et al. ........... 257/72 |
| 6,088,078 A * | 7/2000 | Kim et al. ................. 349/141 |
| 6,160,600 A * | 12/2000 | Yamazaki et al. .......... 349/138 |
| 6,243,154 B1 * | 6/2001 | You et al. .................. 349/141 |
| 6,452,657 B1 | 9/2002 | Suzuki et al. |
| 2005/0078257 A1 * | 4/2005 | Lee et al. ................... 349/141 |
| 2005/0200793 A1 * | 9/2005 | Moon et al. ................ 349/141 |

FOREIGN PATENT DOCUMENTS

| JP | 11-242233 | 9/1999 |
|---|---|---|
| JP | 2000-098405 | 4/2000 |
| JP | 2001-296540 | 10/2001 |
| JP | 2001-296541 | 10/2001 |

* cited by examiner

Primary Examiner—James A Dudek
(74) Attorney, Agent, or Firm—McKenna, Long & Aldridge LLP

(57) ABSTRACT

An in-plane switching mode LCD device includes first and second substrates, a gate line and a data line arranged horizontally and vertically on the first substrate and defining a pixel, a switching device at each crossing of the gate line and the data line, a first common electrode having a first grid structure disposed in the pixel, a first pixel electrode having a second grid structure disposed in the pixel, a first region in the pixel region defined by first sides of the first grid and second sides of the second grid, a second common electrode connecting the first sides and a second pixel electrode connecting the second sides and defining a second region in the first region, a first alignment film and a second alignment film at facing surfaces of the first and second substrate, and a liquid crystal layer between the first and the second substrates.

11 Claims, 12 Drawing Sheets

IN-PLANE SWITCHING MODE LIQUID CRYSTAL DISPLAY DEVICE

The present invention claims the benefit of Korean Patent Application No. 86028/2003 filed in Korea on Nov. 29, 2003, which is hereby incorporated by reference.

BACKGROUND OF THE INVENTION

1. Field of the Invention

The present invention relates to a liquid crystal display device and, more particularly, to an in-plane switching mode liquid crystal display device capable of maintaining maximum light transmittance.

2. Description of the Related Art

A liquid crystal display device is typically used as a high image quality and low-power flat panel display device. The liquid crystal display device is formed by attaching a thin film transistor array substrate and a color filter substrate facing each other with a uniform interval therebetween. A liquid crystal layer is formed between the thin film transistor array substrate and the color filter substrate. Pixels are arranged on the thin film transistor array substrate in a matrix form, and a thin film transistor, a pixel electrode and a capacitor are formed at a unit pixel. A common electrode for applying an electric field to the liquid crystal layer with the pixel electrode, an RGB color filter for implementing color and a black matrix are formed on the color filter substrate. Alignment films are formed at facing surfaces of the thin film transistor array substrate and the color filter substrate and rubbed to make the liquid crystal layer be arranged in a certain direction.

When an electric field is applied between the pixel electrode formed at each unit pixel of the thin film transistor array substrate and the common electrodes formed at the entire surface of color filter substrate, the liquid crystal is rotated due to dielectric anisotropy, whereby the light is transmitted or blocked by unit pixels to display a character or an image. However, such twisted nematic mode liquid crystal display device disadvantageously has a narrow viewing angle. Thus, recently, an in-plane switching mode LCD which solves the problem of the narrow viewing angle by aligning liquid crystal molecules in an almost horizontal direction with respect to the substrate has been actively studied.

Figure 1A:
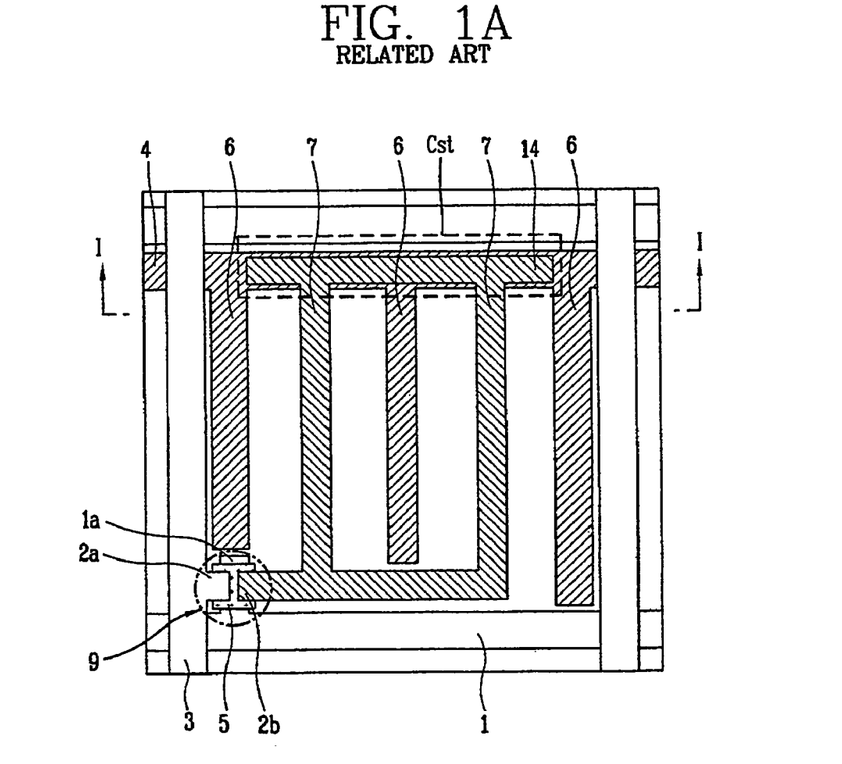
FIGS. 1A and 1B illustrate the related art in-plane switching mode liquid crystal display (LCD) device.
Figure 1B:
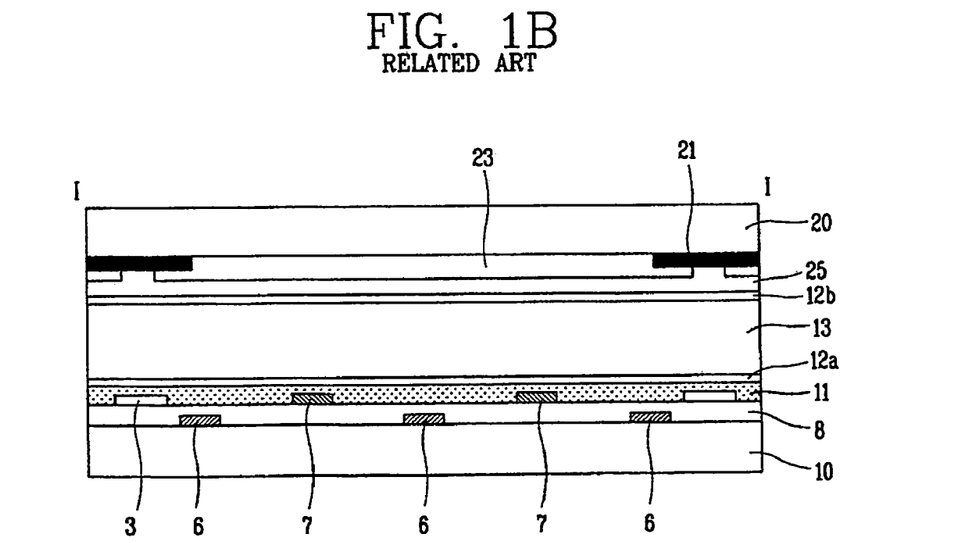

FIGS. 1A and 1B illustrate a unit pixel of the related art in-plane switching mode LCD device. Specifically, FIG. 1A is a plan view and FIG. 1B is a cross-sectional view taken along line I-I of FIG. 1A. As shown in FIGS. 1A and 1B, a gate line 1 and a data line 3 are arranged horizontally and vertically on the first transparent substrate 10, defining a pixel region. In an actual liquid crystal display device, the 'N' number of gate lines 1 and the 'M' number of the data line 3 cross each other to form N×M number of pixels, but in the drawings, only one pixel is shown.

A thin film transistor 9 consisting of a gate electrode 1a, a semiconductor layer 5 and source/drain electrodes 2a and 2b is disposed at a crossing of the gate line 1 and the data line 3. The gate electrode 1a and the source/drain electrodes 2a and 2b are connected to the gate line 1 and the data line 3, separately. A gate insulation film 8 is deposited over on the entire substrate.

A common line 4 is arranged parallel to the gate line 1 in the pixel region, and a pair of electrodes, namely a common electrode 6 and a pixel electrode 7, for switching liquid crystal molecules are arranged parallel to the data line 3. The common electrode 6 is simultaneously formed together with the gate line 1 and connected to the common line 4, and the pixel electrode 7 is simultaneously formed together with the source/drain electrodes 2a, 2b and connected to the drain electrode 2b of the thin film transistor 9.

A passivation film 11 is formed over the entire surface of the substrate including the source electrode 2a and the drain electrode 2b. A pixel electrode line 14 is formed overlapping the common line 4 and connected to the pixel electrode 7. The pixel electrode line 14 forms a storage capacitor (Cst) together with the common line 4 with an gate insulation film 8 interposed therebetween.

A black matrix 21 for preventing a leakage of light to the thin film transistor 9, the gate line 1 and the data line 3, and a color filter 23 for implementing colors are formed on the second substrate 20, on which an overcoat film 25 for flattening the color filter 23 is formed. Alignment films 12a and 12b for determining an initial alignment direction of liquid crystal are formed at the facing surfaces of the first and second substrates 10 and 20, respectively. A liquid crystal layer 13 for controlling light transmittance by a voltage applied across the common electrode 6 and the pixel electrode 7 is formed between the first substrate 10 and the second substrate 20.

Figure 2A:
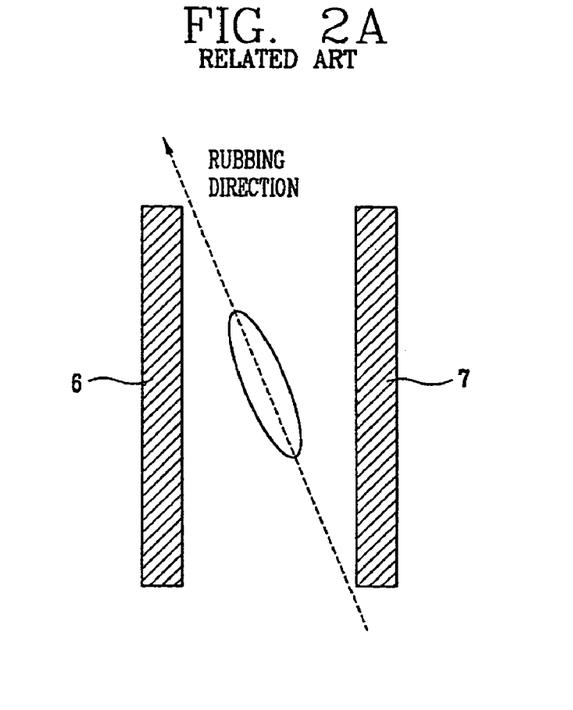
FIGS. 2A and 2B illustrate a driving principle of the related art in-plane switching mode LCD device.
Figure 2B:
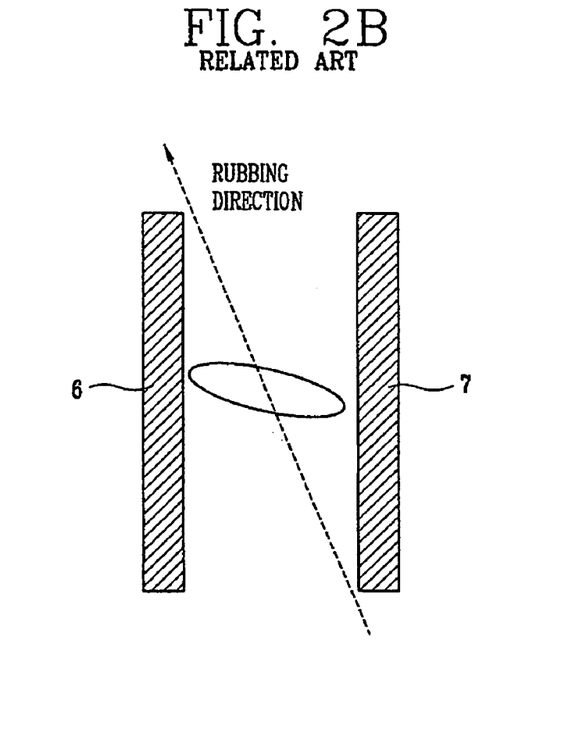

FIGS. 2A and 2B illustrate a driving principle of the related art in-plane switching mode LCD device. FIG. 2A shows driving of the liquid crystal molecules when the voltage is not applied between the common electrode 6 and the pixel electrode 7 and FIG. 2B shows driving of the liquid crystal molecules when a voltage is applied therebetween.

First, with reference to FIG. 2A, when the voltage is not applied to the in-plane switching mode LCD device, the liquid crystal molecule in the liquid crystal layer is aligned along a rubbing direction (the direction of arrow ↑ in FIG. 2A) of the alignment films formed at the facing surfaces of the first and second substrates. With reference to FIG. 2B, when a voltage is applied across the common electrode 6 and the pixel electrode 7, an electric field is generated therebetween and the liquid crystal molecule transmits an amount of light corresponding to the intensity of the electric field.

Figure 3:
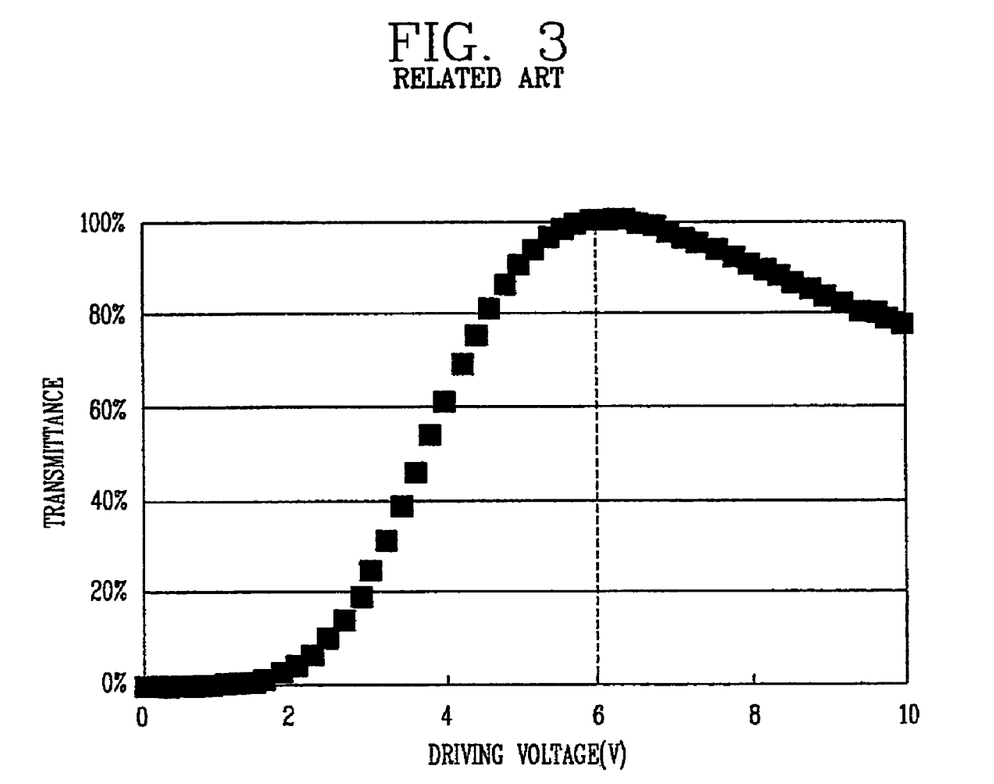
FIG. 3 is a graph showing light transmittance characteristics according to a drive voltage of an in-plane switching mode LCD device in accordance with the related art.

FIG. 3 is a graph showing light transmittance characteristics according to a drive voltage of an in-plane switching mode LCD device in accordance with the related art. As shown in FIG. 3, as the voltage-applied to the common electrode and the pixel electrode increases, the light transmittance linearly increases. However, if the voltage continues to increase, the light transmittance decreases begins to decrease at 6V. In this case, assuming that the voltage value representing a maximum light transmittance is Vmax, the Vmax voltage value is the voltage at which the liquid crystal molecule makes a 45° with respect to the initial alignment direction of the alignment film.

If a voltage greater than Vmax is applied, the transmittance drops. However, the transmittance obtained in the graph shows an ideal case, and an actual product has maximum luminance at a voltage lower than Vmax, which is a theoretical voltage value. Thus, the in-plane switching mode LCD device has a problem in that the liquid crystal molecules of the liquid crystal layer are always switched on the same plane, reducing the grey level in the vertical and horizontal viewing angle directions and light transmittance at voltages higher voltage than Vmax is less. To solve such problems, a voltage lower than Vmax is set as a Vmax of the actual product, but in this case, there is a high possibility that maximum luminance of the product will not occur. In addition, even though the white state needs to be displayed by applying Vmax, since liquid crystal molecules are collectively arranged in one direction, a screen image viewed in the direction of the shorter side of the liquid crystal molecules has a yellowish and a screen image viewed in the direction of the longer side has a bluish, degrading image quality.

SUMMARY OF THE INVENTION

Accordingly, the present invention is directed to an in-plane switching mode liquid crystal display that substantially obviates one or more of the problems due to limitations and disadvantages of the related art.

An object of the present invention is to provide an in-plane switching mode liquid crystal display (LCD) device and its fabrication method capable of preventing degradation of transmittance even at voltages higher than Vmax.

Another object of the present invention is to provide an in-plane switching mode liquid crystal display (LCD) device and its fabrication method capable of enhancing image quality by minimizing a color tint phenomenon that occurs at different viewing angles.

Another object of the present invention is to provide an in-plane switching mode LCD device capable of enhancing luminance.

Additional features and advantages of the invention will be set forth in the description which follows, and in part will be apparent from the description, or may be learned by practice of the invention. The objectives and others advantages of the invention will be realized and attained by the structure particularly pointed out in the written description and claims hereof as well as the appended drawings.

To achieve these and other advantages and in accordance with the purpose of the present invention, as embodied and broadly described herein, an in-plane switching mode LCD device includes first and second substrates, a gate line and a data line arranged horizontally and vertically on the first substrate and defining a pixel, a switching device at each crossing of the gate line and the data line, a first common electrode having a first grid structure disposed in the pixel, a first pixel electrode having a second grid structure disposed in the pixel, a first region in the pixel region defined by first sides of the first grid and second sides of the second grid, a second common electrode connecting the first sides and a second pixel electrode connecting the second sides and defining a second region in the first region, a first alignment film and a second alignment film at facing surfaces of the first and second substrate, and a liquid crystal layer between the first and the second substrates.

In another aspect of the present invention, an in-plane switching mode LCD device includes first and second substrates, a gate line and a data line arranged horizontally and vertically on the first substrate and defining a pixel, a first common electrode having a first grid structure disposed in the pixel, a first pixel electrode having a second grid structure disposed in the pixel, a first region in the pixel region defined by first sides of the first grid and second sides of the second grid, an arc-shaped second common electrode connecting the first sides and an arc-shaped second pixel electrode connecting the second sides and defining a second region in the first region, a first alignment film and a second alignment film at facing surfaces of the first and second substrate, and a liquid crystal layer between the first and the second substrates.

In another aspect of the present invention, an in-plane switching mode LCD device includes first and second substrates, a gate line and a data lines arranged horizontally and vertically on the first substrate to define a pixel, a switching device at each crossing of the gate line and the data line, a first common electrode having an L-shape and a first pixel electrode having an upside-down L-shape and defining a substantially square-shape region, a second common electrode and a second pixel electrode disposed and defining an arc shape region in the substantially square-shape region, and a liquid crystal layer formed between the first and the second substrates.

In a further aspect of the present invention, an in-plane switching mode LCD device includes first and second substrates, a gate line and a data line arranged horizontally and vertically on the first substrate and defining a pixel, a common electrode and a pixel electrode disposed in the pixel defining an arc-shaped region generating an electric field in the arc-shaped region, first and second alignment films formed at facing surfaces of the first and the second substrates, a rubbing direction maintaining an angle of about 45° with respect to a direction of the electric field which is greater than a maximum driving voltage applied at the common electrode and the pixel electrode, and a liquid crystal layer formed between the first and the second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

An in-plane switching mode LCD device and its fabrication method in accordance with the present invention will now be described with reference to the accompanying drawings.

Figure 4A:
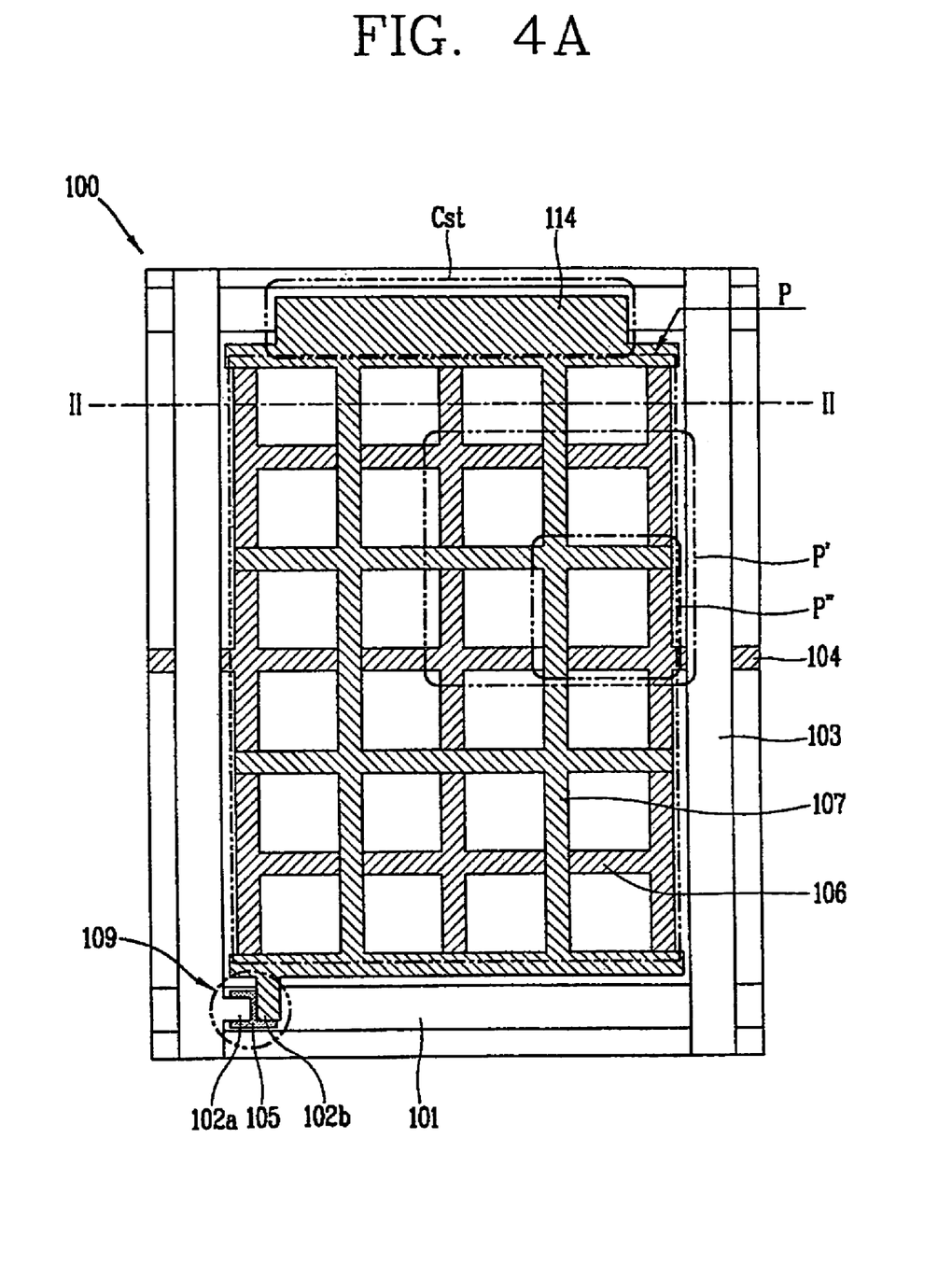
FIGS. 4A and 4B illustrate an in-plane switching mode liquid crystal display (LCD) device in accordance with a first embodiment of the present invention.
Figure 4B:
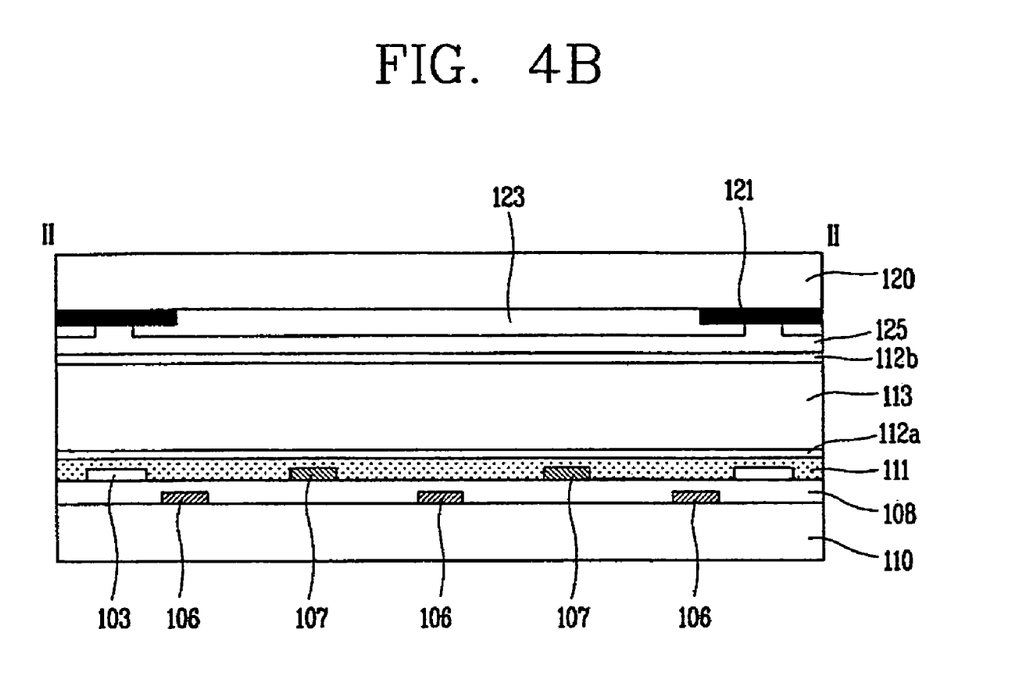

FIGS. 4A and 4B illustrate an in-plane switching mode liquid crystal display (LCD) device in accordance with a first embodiment of the present invention. FIG. 4A is a plan view and FIG. 4B is a cross-sectional view taken along line II-II of FIG. 4A. As shown, in the in-plane switching mode LCD device 100, a gate line 101 and a data line 103 are arranged on a transparent first substrate 110 horizontally and vertically and define a unit pixel P. A switching device 109 is disposed at the crossing of the gate line 101 and the data line 103, which includes a gate electrode 101a extended from the gate line 101, a semiconductor layer 105 formed on the gate electrode 101a and source/drain electrodes 102a and 102b disposed with a certain interval therebetween on the semiconductor layer 105.

A common electrode 106 is formed in a grid structure that divides the unit pixel P into at least one first divided region P'. A pixel electrode 107 is formed in a grid structure that divides the first divided region (P') into four second divided regions (P'''). The common electrode 406 and the pixel electrode 107 defining the second divided region P''' have the shapes of an 'L' and an upside-down 'L' respectively. Accordingly, the second divided region P''' has a square shape and an electric field is formed in the diagonal direction by the common electrode 106 and the pixel electrode 107.

The common electrode 106 is disposed at an outer edge of the pixel P and connected to the common line 104 disposed in parallel to the gate line 101 to receive a common voltage signal to shield a signal of the data line 103 from a signal-of the-pixel electrode 107. The pixel electrode 107 is connected to a storage electrode 114 overlapping the gate line 101. The storage electrode 114 forms a storage capacitor (Cst) with the gate insulation film 108, which overlaps the gate line 101. The common electrode 106 and the pixel electrode 107 are electrically insulated by the gate insulation film 108 interposed therebetween. A passivation film 111 is formed over the entire surface of the substrate including the pixel electrode 107.

A black matrix 121 for preventing a leakage of light and a color filter 123 for implementing colors are formed on the second substrate 120. First and second alignment films 112a and 112b for determining an initial alignment direction of liquid crystal are formed at facing surfaces of the first and second substrates 110 and 120. A liquid crystal layer 113 is interposed between the first and second substrates 110 and 120. Such an in-plane switching mode LCD device, as described above, controls light transmittance by realigning liquid crystal molecules in correspondence to the voltage applied to the common electrode 106 and the pixel electrode 107.

Figure 5A:
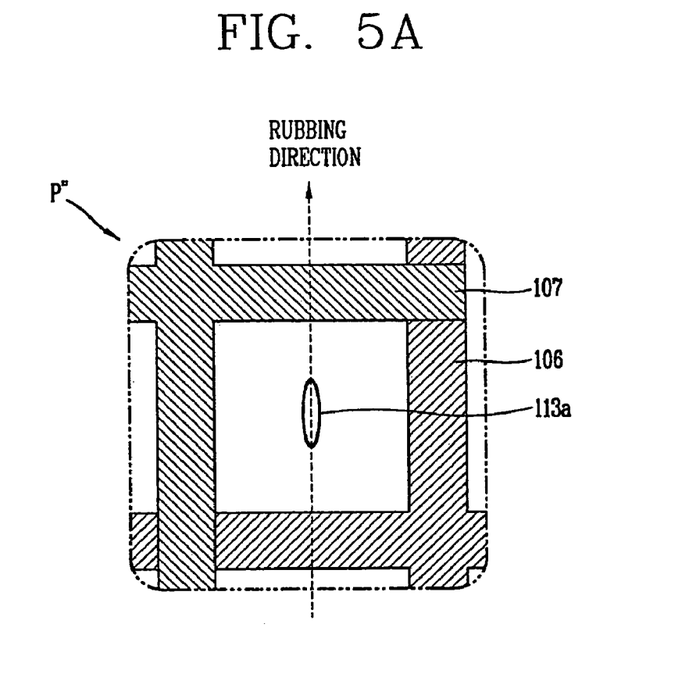
FIGS. 5A and 5B illustrate a driving principle of the in-plane switching mode LCD device of FIGS. 4A and 4B.
Figure 5B:
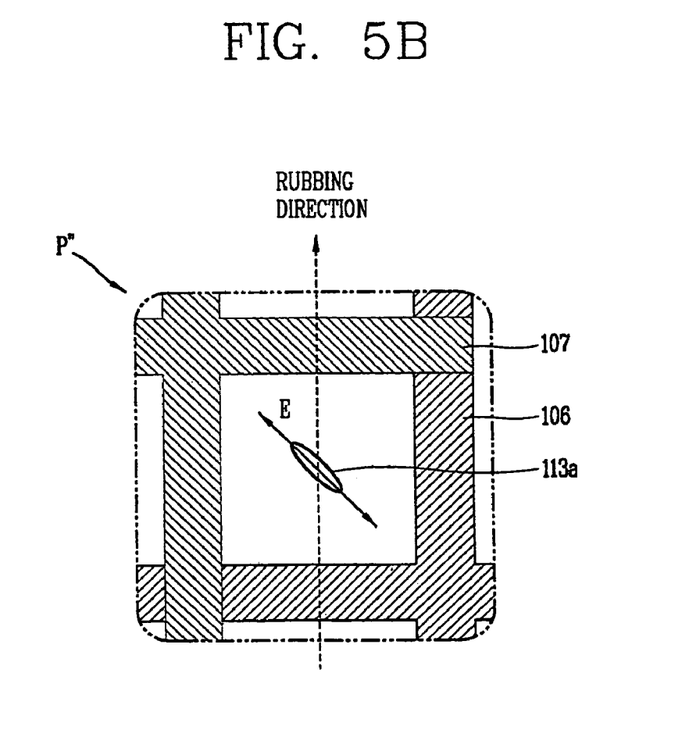

FIGS. 5A and 5B illustrate a driving principle of the in-plane switching mode LCD device in accordance the first embodiment of the present invention. Specifically, FIG. 5A shows alignment of the liquid crystal molecules when a voltage is not applied across the common electrode 106 and the pixel electrode 107 in the second divided region P'''. FIG. 5B shows alignment of liquid crystal molecules when a voltage is applied across the common electrode 106 and the pixel electrode 107 in the second divided region P'''.

First, with reference to FIG. 5A, when a voltage is not applied across the common electrode 106 and the pixel electrode 107, the liquid crystal molecules 113a are disposed in the rubbing direction (the direction of arrow ↑) of the alignment films formed at the facing surfaces of the first and second substrates 110 and 120. The rubbing direction of the alignment films are parallel to the direction of the data line 103. The liquid crystal molecules 113a are arranged parallel to the direction of the data line 103 so as to display a black screen. In the alternative, the rubbing direction can be parallel to the direction of the gate line 101 so that the liquid crystal molecules is arranged parallel to the direction of the gate line 101.

With reference to FIG. 5B, when a voltage is applied across the common electrode 106 and the pixel electrode 107, an electric field is generated therebetween. The liquid crystal molecules 113a are realigned, and at this time, the light transmittance capability of the liquid crystal molecules corresponds to the applied voltage.

Figure 6:
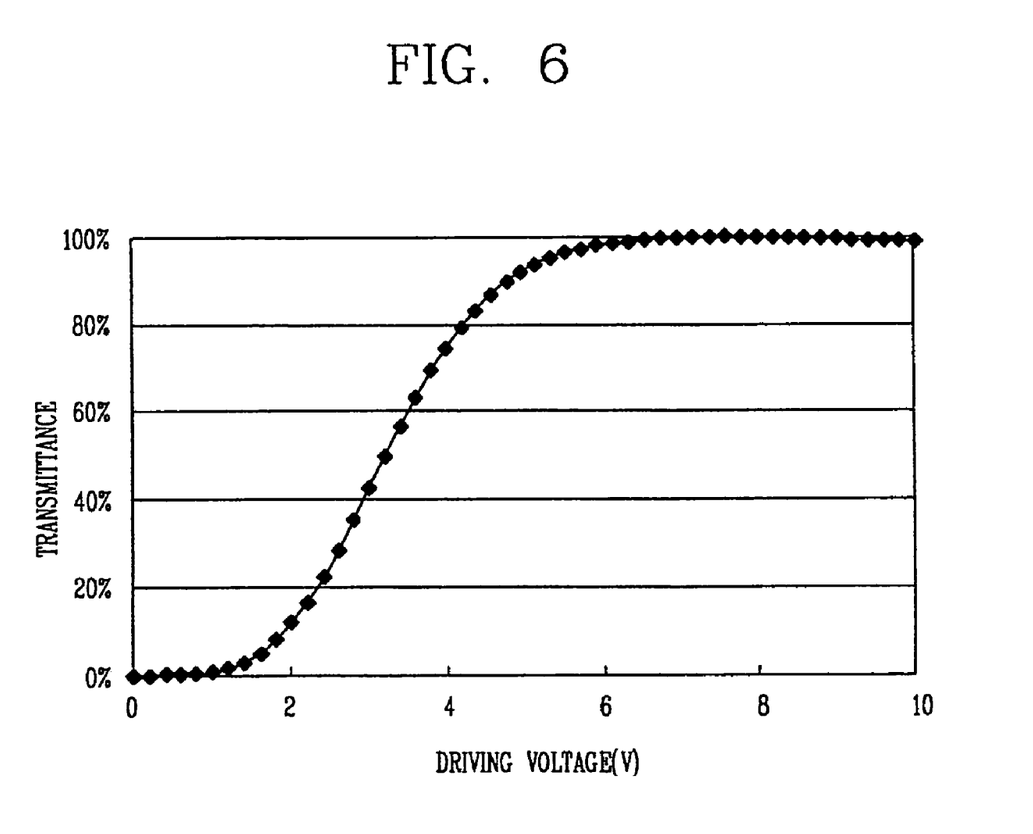
FIG. 6 is a graph showing light transmittance characteristics according to a drive voltage of the in-plane switching mode LCD device shown in FIGS. 4A and 4B.

FIG. 6 is a graph showing light transmittance characteristics according to a drive voltage of an-in-plane switching mode LCD device in accordance with a first embodiment of the present invention. As shown in FIG. 6, if a voltage is not applied, the light transmittance is 0, and as the voltage increases, the light transmittance almost linearly increases. When the voltage reaches a certain level (namely, a maximum transmittance), the light transmittance does not increase any higher even if the voltage is further increased and the maximum transmittance is maintained as it is rather than being reduced as in the related art (refer to FIG. 3). The voltage at a start point of the maximum transmittance is defined as Vmax.

The reason why the maximum transmittance is maintained without being reduced is because of the structural characteristics of the common electrode and the pixel electrode in the present invention. In general, the light transmittance (T) can be calculated by equation (1) shown below:

$$\text{light transmittance } (T) = \sin^2(2\alpha)\sin^2(\pi d \, \Delta n(\lambda)/\lambda) \quad \text{equation (1)}$$

wherein α is an angle between a polarization plate and an optical axis of liquid crystal molecules, d is a cell gap, and λ is a wavelength of light. Accordingly, if a direction of the polarization plate and the rubbing direction are the same, the value obtained by equation (1), namely, the angle between polarization plate and the optical axis of the liquid crystal molecules is 45°, light transmittance is maximized.

With reference to FIG. 5B, the structure of the common electrode 106 and the pixel electrode 107, the common electrode 106 and the pixel electrode 107 respectively have the shape of an 'L' and an upside-down 'L' shape defining the square second divided region P'''. When a voltage is applied across the common electrode 106 and the pixel electrode 107, an electric field is formed in a diagonal direction (in the direction of the arrow) across the corner portions that face each other in the second divided region (P'''). In this case, the direction of the electric field does not exceed substantially 45° with respect to the vertical direction the rubbing direction. Accordingly, even if a voltage higher than Vmax is applied, since the liquid crystal molecules 113a do not exceed 45° with respect to the rubbing direction, the light transmittance is not reduced.

Figure 7:
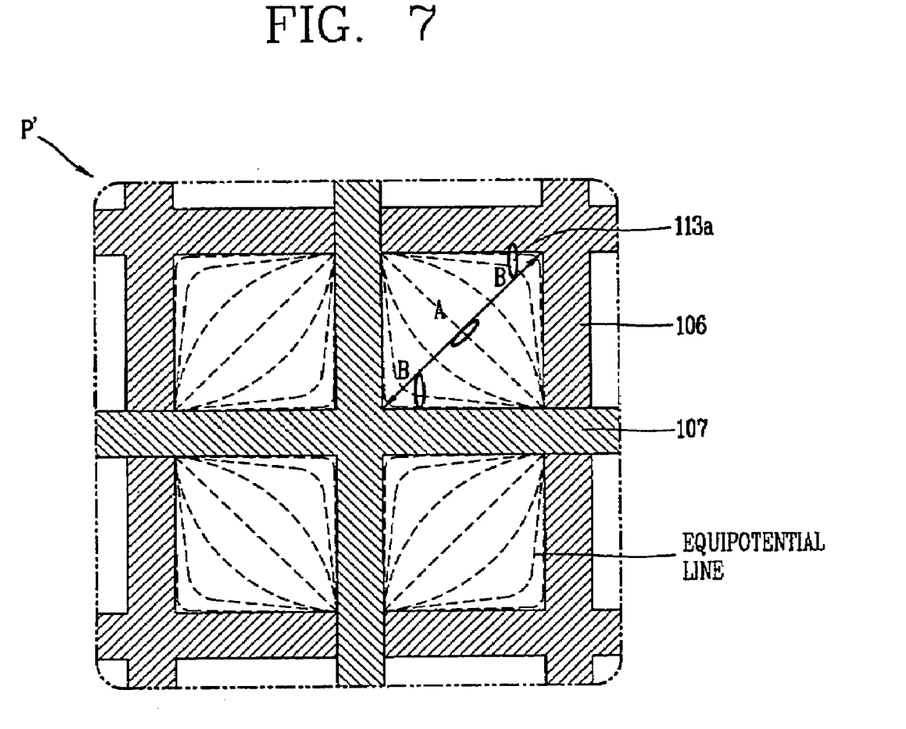
FIG. 7 shows equipotential lines in a first divided region in accordance with a first embodiment of the present invention.

In other words, with reference to FIG. 7, when Vmax is applied to the common electrode 106 and the pixel electrode 107, the liquid crystal molecules 113a are arranged along the direction of field generated between the common electrode 106 and the pixel electrode 107 and transmit light. A boundary is formed among regions where the alignment states of liquid crystal molecules are different. The boundary is defined by the pixel electrode 107, which forms four domains in the first divided region P'. Namely, the liquid crystal molecules alignments are the same in a diagonal direction across the first divided region P'. Further, liquid crystal molecules alignments are horizontally symmetrical based at that boundary where the alignment states of liquid crystal molecules are different. The liquid crystal molecules are normally driven in the second divided region P''' based alignment states of liquid crystal molecules at the boundary, transmitting light to its maximum. In addition, thanks to the multi-domain structure having the horizontally symmetrical property, abnormal light according to birefringence characteristics of liquid crystal is mutually offset, thereby minimizing the color shift phenomenon.

Figure 8:
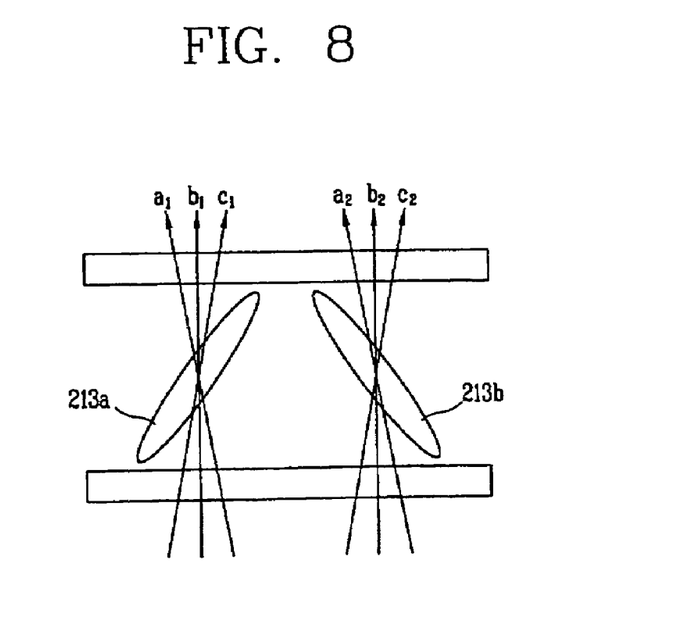
FIG. 8 illustrates offset of abnormal light according to birefringence characteristics of liquid crystal in two domains.

In detail, as shown in FIG. 8 in the case of two domains where liquid crystal molecules are arranged symmetrically, a birefringence value of a1 of the first liquid crystal molecule 213a offsets a birefringence value of a2 of the second liquid 213b crystal molecules having an molecule arrangement in the opposite direction to the first liquid crystal molecules 213a, resulting in that a birefringence becomes 0. In addition, a birefringence value c1 is compensated by c2. Accordingly, the color shift phenomenon due to the birefingence characteristics of liquid crystal is minimized, and thus, degradation of image quality according to a viewing angle can be prevented.

In the in-plane switching mode LCD device having such a structure, at the central portion A that the common electrode 106 and the pixel electrode 107 face each other, an electric field is formed in the direction of 45° exactly with respect to the rubbing direction, having a maximum transmittance, but at the corner portions B where electrode is bent, the direction of electric field does not make 45° with respect to the rubbing-direction due to formation of the equipotential line. Herein, the dotted line indicates equipotential lines. That is, transmittance is degraded in the corner portions of B. To solve this problem, a pixel electrode each having an eye shaped structure are added in the second divided region. That is, by additionally forming the common and pixel electrodes to have an eye-shaped structure in the second divided region defined by the common electrode and the pixel electrode, the portion A exhibiting the maximum transmittance can be enlarged, and the corner portion 'B' having the degraded luminance due to the electric field distortion can be reduced such that the overall luminance can be improved.

Figure 9A:
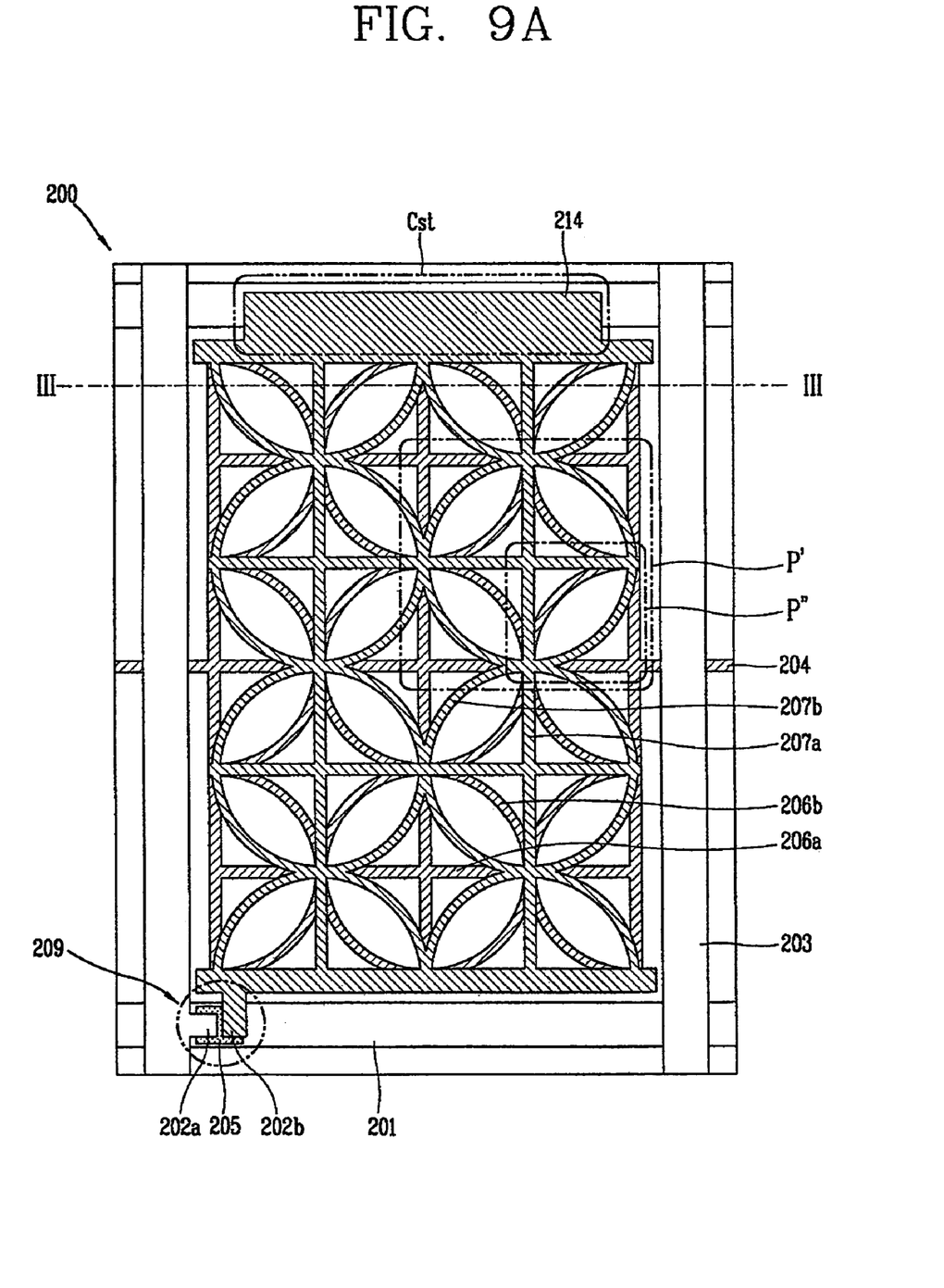
FIGS. 9A and 9B illustrate an in-plane switching mode liquid crystal display (LCD) device in accordance with a second embodiment of the present invention
Figure 9B:
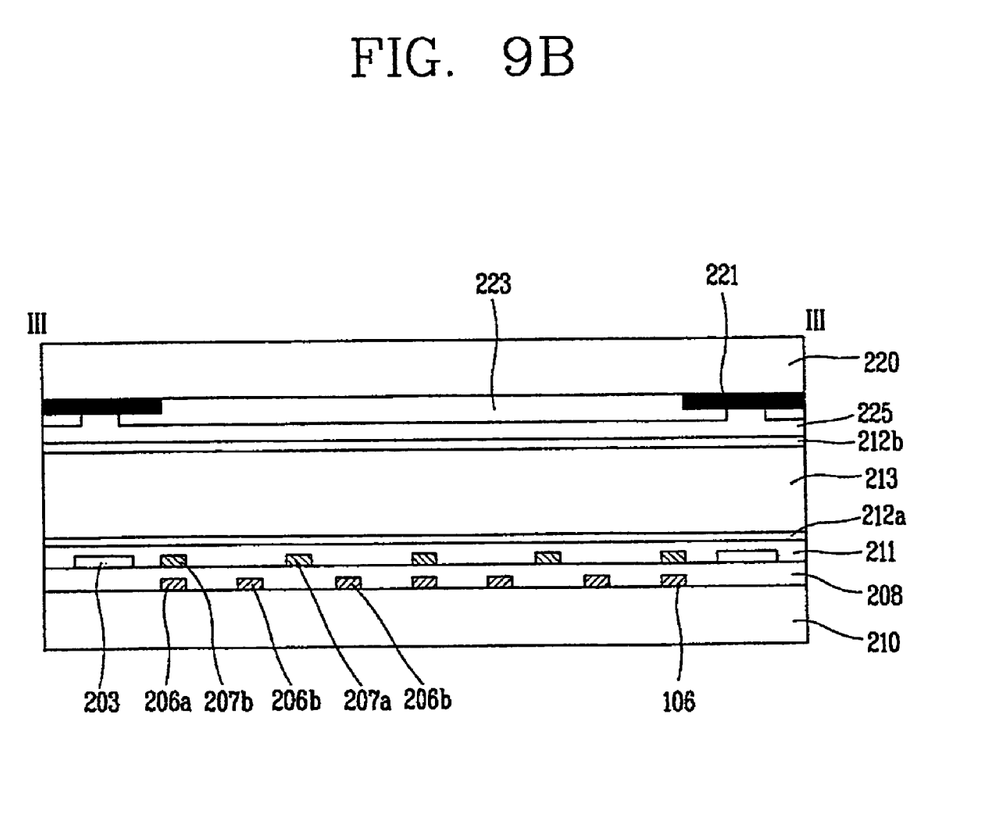

FIGS. 9A and 9B illustrate an in-plane switching mode liquid crystal display (LCD) device capable of enhancing luminance by enlarging the central portion of the second divided region to exhibit a maximum transmittance in accordance with a second embodiment of the present invention. Specifically, FIG. 9A is a plan view and FIG. 9B is a sectional view taken along line III-III' of FIG. 9A. As shown in FIG. 9A, in an in-plane switching mode LCD device 200, a gate line 201 and a data line 203 are arranged on a transparent first substrate 210 horizontally and vertically to define a unit pixel P. A switching device 209 is disposed at the crossing of the gate line 201 and the data line 203. The switching device 209 includes a gate electrode 201a extended from the gate line 201, a semiconductor layer 205 formed on the gate electrode 201a and source/drain electrodes 202a and 202b disposed with a certain interval therebetween on the semiconductor layer 205.

A first common electrode 206a is formed in a grid structure to divide the unit pixel P into at least one first divided region P'. A first pixel electrode 207 is formed in a grid structure to divide the first divided region P' into four second divided regions P'''. A second common electrode 206b and a second pixel electrode 207b, each having an arc-shaped structure are formed in the second divided region P''' so as to define an eye-shaped region.

The common electrode 206 is disposed at an outer edge of the pixel P adjacent to the data line 203 connected to the common line 204 disposed in parallel to the gate line 201 to receive a common voltage signal shields a signal of the data line 203 from a signal on the pixel electrode 207. The pixel electrode 207a is connected to a storage electrode 214 overlapping the gate line 201, and the storage electrode 114 forms a storage capacitor (Cst) with the gate insulation film 108, which overlaps the gate line 101.

The first and second common electrodes 206a and 206b and the first and second pixel electrodes 207a and 207b are electrically insulated by the gate insulation film 108 interposed therebetween. A passivation film 211 is formed over the entire surface of the substrate including the first and second pixel electrode 207a and 207b. In this case, the pixel electrodes 207a and 207b can be disposed on the passivation film. Since the pixel electrodes can be made of a transparent material, such as ITO (Indium Tin Oxide) or IZO (Indium Zinc Oxide), the aperture ratio can be improved.

A black matrix 221 for preventing a leakage of light and a color filter 223 for implementing colors are formed on the second substrate 220. A first and second alignment films 212a and 212b for determining an initial alignment direction of liquid crystal are formed at facing surfaces of the first and second substrates 210 and 220, and a liquid crystal layer 213 is interposed therebetween. The in-plane switching mode LCD device 200 constructed, as described above, controls light transmittance in correspondence to the voltage applied across the first and second common electrodes 206a and 206b and the first and second pixel electrodes 207a and 207b.

Figure 10A:
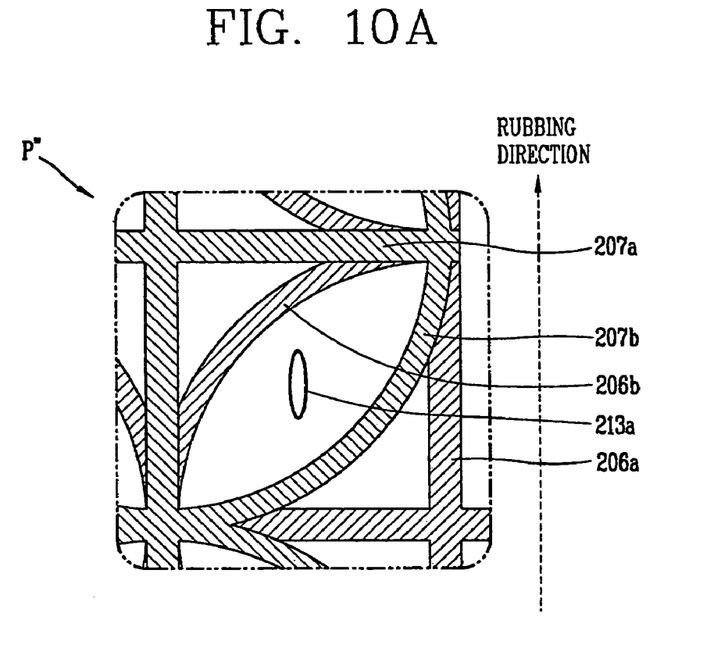
FIGS. 10A and 10B illustrate a driving principle of the in-plane switching mode LCD device shown in FIGS. 9A and 9B.
Figure 10B:
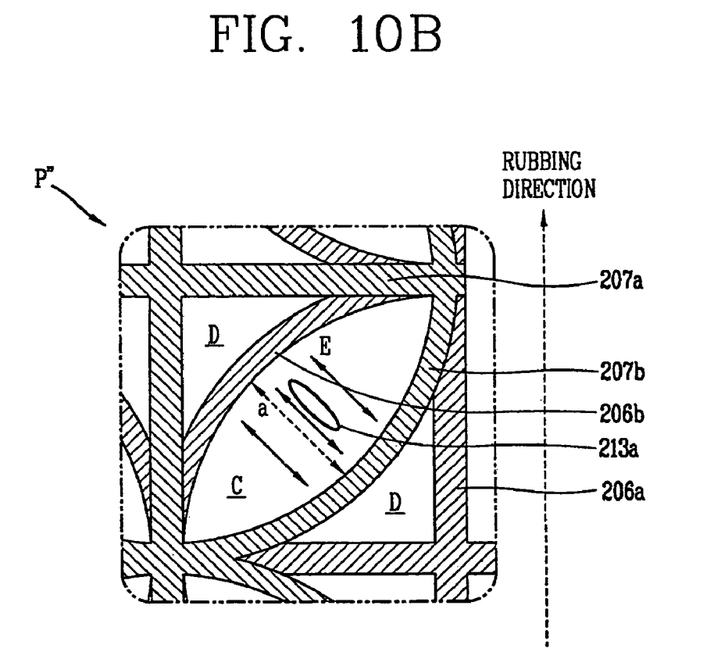

FIGS. 10A and 10B illustrate a driving principle of the in-plane switching mode LCD device in accordance with the second embodiment of the present invention. Specifically, FIG. 10A shows alignment of liquid crystal molecules when a voltage is not applied to the common electrodes 206a and 206b and the first and second pixel electrodes 207a and 207b in the second divided region P'''. FIG. 10B shows alignment of liquid crystal molecules when a voltage is applied to the common electrodes 206a and 206b and the first and second pixel electrodes 207a and 207b in the second divided region P'''. The driving principle of the second embodiment of the present invention is the same as the first embodiment (FIGS. 5A and 5B).

First, with reference to FIG. 10A, when a voltage is not applied across the first and second common electrodes 206a and 206b and the first and second pixel electrodes 207a and 207b, the liquid crystal molecules 213a are disposed in the rubbing direction (the direction of arrow ↑) of the alignment film. The rubbing direction of the alignment film is parallel to the direction of the data line 203, the liquid crystal molecules 213a are arranged parallel to the direction of the data line 203 for displaying a black screen when no voltage is applied. In the alternative, the rubbing direction can be parallel to the direction of gate line 201, namely, perpendicular to the data line 203 and in this case, the liquid crystal molecules is arranged parallel to the direction of the gate line 201.

With reference to FIG. 10B, when a voltage is applied across the first and second common electrodes 206a and 206b and the first and second pixel electrodes 207a and 207b, electric field is generated that realigns the liquid crystal molecules 113a. The light transmittance capability of the liquid crystal molecules corresponds to the value of the applied voltage. Like in the first embodiment of the present invention, the light transmittance won't be reduced even at a level higher than Vmax and maximum transmittance is maintained.

The reason why the maximum transmittance is maintained without being reduced is because of the structural characteristics of the common electrode and the pixel electrode in embodiments of the present invention. Namely, referring to the structure of the first and second common electrodes 206a and 206b and the first and second pixel electrodes 207a and 207b, the first common electrode 206a and the first pixel electrode 207a are bent 90° and each bent region faces each other to define a square shape. The second common electrode 206b and the second pixel electrode 207b have an arc-shaped structure disposed within the square region defined by the first common electrode 206a and the first pixel electrode 207a so as to define an eye-shaped region. The direction of electric field generated by the second common electrode 206b and the second pixel electrode 207b does not exceed 45° with respect to the rubbing direction.

In the eye-shaped region C defined by the second common electrode and the second pixel electrode 206b and 207b and the bent region D of the first common electrode 206a and the first pixel electrode 207a, an electric field generated in region C maintains 45° with respect to the rubbing direction even at a voltage level higher than the maximum voltage Vmax, the region has the maximum light transmittance. Meanwhile, an electric field generated in region D does not accurately form an angle of 45° with respect to the rubbing direction but still has improved light transmittance compared to the first embodiment of the present invention.

The distance between the electrodes is too long such that electric field is severely distorted at the corner portion in the first embodiment of the present invention (refer to FIG. 5B). In the second embodiment of the present invention, the electric field formed at the corner portion (region D) formed by the first common electrode 206a and the second pixel electrode 207b or by the second common electrode 206b and the first pixel electrode 207a is minimized due to the reduced distance between electrodes compared to the first embodiment, and thus luminance at the corner portion improved.

In addition, since the distance between the electrodes of the region C exhibiting the maximum light transmittance is reduced compared to the first embodiment, an electric field formed in the region C is stronger than in the first embodiment of the present invention. Accordingly, response speed of liquid crystal is faster and the maximum luminance voltage Vmax can be lowered. Moreover, in the second embodiment of the present invention, the corner portion where liquid crystal is abnormally driven is reduced and the maximum light transmittance region is increased such that overall luminance enhancement can be accomplished. Namely, by lengthening the distance between the two electrodes 206b and 207b of the region C where liquid crystal is normally driven, the maximum light transmittance region can be enlarged. Thus, the overall luminance is improved.

Figure 11:
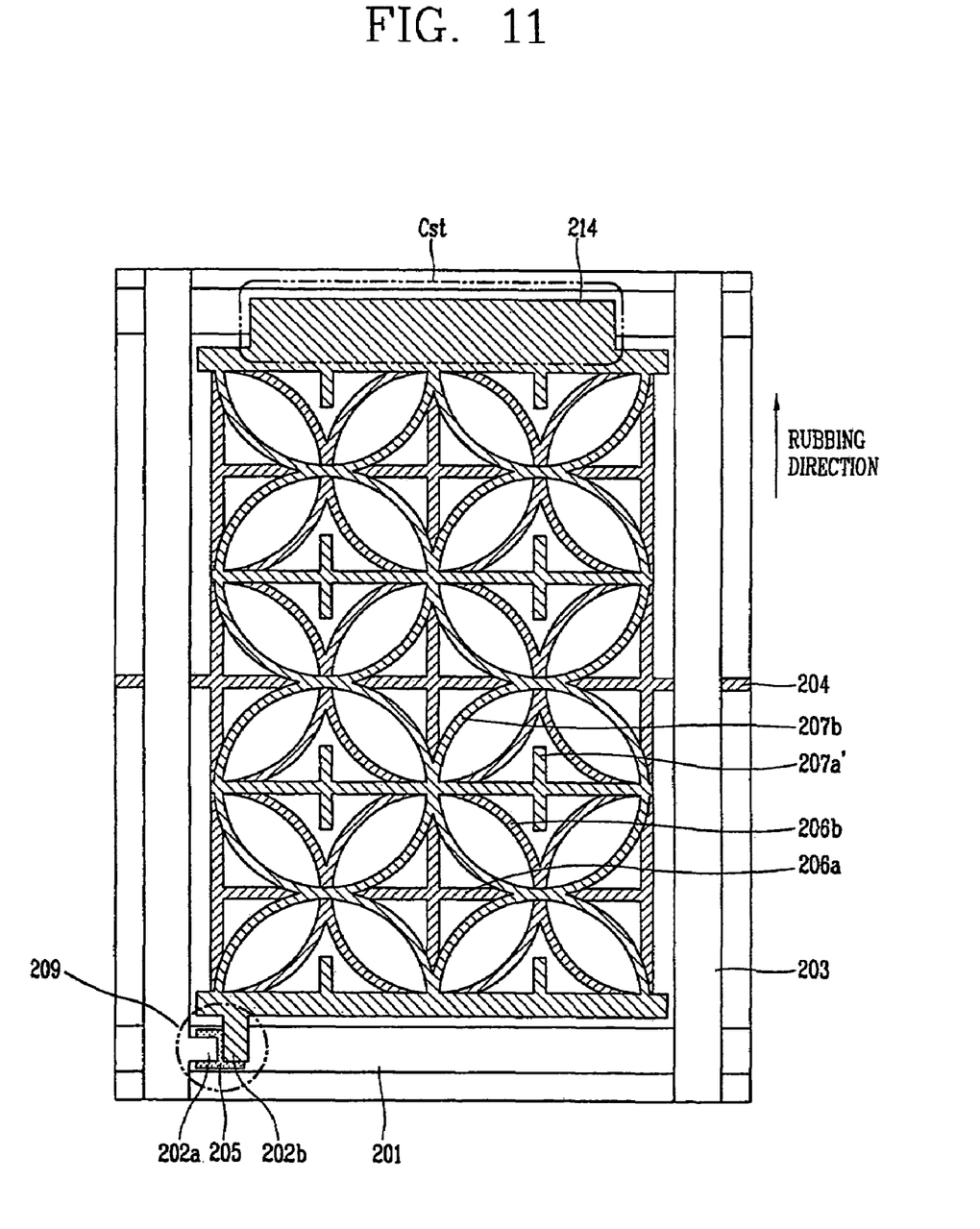
FIG. 11 illustrates an in-plane switching mode LCD device in accordance with a third embodiment of the present invention.

FIG. 11 illustrates an in-plane switching mode LCD device in accordance with a third embodiment of the present invention. Elements of the third embodiment of the present invention, except for the structure of a second pixel electrode, are the same as those in the second embodiment (FIGS. 9A and 9B) of the present invention. The same reference numerals are given to the same elements and its descriptions are omitted.

With reference to FIG. 11, an LCD device 300 in accordance with the third embodiment of the present invention has an eye-shaped structure in which a second common electrode 206b and a second pixel electrode 207b generating horizontal electric field making 45° with respect to the rubbing direction are disposed and a first pixel electrode 207a' formed at corner portions has a discontinuous '+' shape in its structure. In this case, a portion of the first pixel electrode 207a' parallel to the gate line 201 is abridged. The abridged first pixel electrode 207a' can be formed parallel to the data line 203, and a first common electrode 206a can be formed to be discontinuous, instead of the first pixel electrode 207a'.

As so far described, in the present invention, the common electrode and the pixel electrode are bent by 90° and face each other, so that the light transmittance can be maintained even at a level higher than the maximum voltage Vmax. Thus, maximum luminance can be maintained without reduction when the structure of the present invention is applied to an actual product, the Vmax value can be set higher than a theoretical value, so the maximum luminance will occur.

Since the common electrode and the pixel electrode are formed in an eye-shape structure, liquid crystal disposed in the eye-shaped structure can have maximum luminance such that overall luminance can be improved. The common electrode and the pixel electrode defining the eye-shaped structure can be formed within a region defined by a different common electrode and pixel electrode are bent by 90° and face each other. However, the present invention is not limited to the structures shown in the embodiments but has an eye-shaped structure and includes every structure generating-electric field direction making 45° with respect to the rubbing direction.

The basic concept of the present invention is to dispose the pixel electrode and the common electrode having the eye structure inside a pixel, and horizontal electric field generated by the pixel electrode and the common electrode can include every LCD device forming 45° direction with respect to the rubbing direction. Since the common electrode and the pixel electrode are arranged mutually vertically, the maximum luminance cam be maintained as it is without degradation even at a voltage level higher than Vmax, and by forming an electrode protruding into the sub-pixel from the common electrode and the pixel electrode, a transmitting region of liquid crystal molecules can be increased and thus luminance improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An in-plane switching mode LCD device comprising:
   first and second substrates;
   a gate line and a data line arranged horizontally and vertically on the first substrate and defining a pixel;
   a first common electrode disposed in the pixel, the first common electrode including a plurality of first electrodes along the gate and data lines;
   a first pixel electrode disposed in the pixel, the first pixel electrode including a plurality of second electrodes along the gate and data lines;
   a first region in the pixel region defined by two sides of the first electrode and two sides of the second electrode;
   an arc-shaped second common electrode connecting the first sides and an arc-shaped second pixel electrode connecting the second sides, the arc-shaped second common electrode and arc-shaped second pixel electrode being disposed in the first region defined by first and second electrodes to define a second region;
   a first alignment film and a second alignment film at facing surfaces of the first and second substrate; and
   a liquid crystal layer between the first and the second substrates.

2. The device of claim 1, wherein the second common electrode and the second pixel electrode are symmetrical.

3. The device of claim 1, wherein the first pixel electrode includes one or more abridged portions.

4. The device of claim 1, wherein the first common electrode includes one or more abridged portions.

5. The device of claim 1, wherein each of the first region includes an independent domain compensating for one another.

6. The device of claim 1, wherein the switching device comprises:
a gate electrode connected to the gate line;
a gate insulation film on the gate electrode;
a semiconductor layer on the gate insulation film; and
a source and a drain electrodes on the semiconductor layer.

7. The device of claim 1, wherein the second substrate includes a color filter and a black matrix.

8. The device of claim 1, further comprising: a common line electrically connected to the first and the second common electrodes.

9. The device of claim 1, further comprising:
a storage electrode connected to the first and the second pixel electrodes and forming a storage capacitor by overlapping the gate line.

10. The device of claim 1, wherein the rubbing direction of the first and second alignment films is substantially the same direction of the gate line.

11. The device of claim 1, wherein the rubbing direction of the first and second alignment films is substantially the same direction of the data line.

* * * * *